United States Patent Office 2,702,285
Patented Feb. 15, 1955

2,702,285

STABLE COPOLYMER LATEX AND PAINT COMPRISING SAME

Robert L. Bebb, Akron, John H. Musch, Silver Lake, and James M. Willis, Akron, Ohio, and Verle A. Miller, Dover, Del., assignors to The Firestone Tire & Rubber Company, Akron, Ohio, a corporation of Ohio No Drawing. Application August 19, 1954, Serial No. 453,412

28 Claims. (Cl. 260—29.7)

This invention relates to an especially stable type of high styrene-low butadiene copolymer latex, which possesses unusual film-forming as well as adhesive properties. The invention also relates to an improved water dispersion paint embodying the improved latex. This application is a continuation-in-part of our copending application Serial No. 251,988, filed October 18, 1951, which is a continuation-in-part of our earlier application Serial No. 182,128, filed August 29, 1950, and now abandoned.

It has been proposed to incorporate a latex of natural or synthetic rubber into a water dispersion paint. These proposals have not proved to be commercially practicable, however, for various reasons. A film from any of the rubber latices heretofore available was soft and tacky; when the latex was mixed with paint pigments and a film of the resulting paint was dried, the film was soft and would not withstand washing with water.

Recently it has been proposed to incorporate certain copolymers of butadiene and styrene into water dispersion paints. The proposed polymers contained at least about 40 to 45% of butadiene. A film, cast from a latex of the proposed polymers, was soft and tacky, similar to the films previously cast from natural and synthetic rubber latices. Although a water dispersion paint comprising a latex of the proposed polymers was an improvement over previous paints containing a rubber latex, it still failed to produce a dried paint film of sufficient hardness to compete successfully with oil base paints.

Therefore, it is an object of the invention to provide an improved synthetic polymer dispersion suitable for incorporating into a water dispersion paint. Another object is to provide an improved water dispersion paint giving paint films of sufficient hardness and gloss to compete successfully with oil base paints. Another object is to provide an improved method of polymerizing and stabilizing a synthetic polymer dispersion, and to provide the improved stabilized latex. The above and other objects will become apparent in the description of the invention which follows:

The improved synthetic polymer dispersions of the invention are produced by copolymerization of 1,3-butadiene and styrene in fixed proportions and under specific and critical conditions. In order to produce continuous films of the desired hardness it has been found necessary that the copolymer contain no more than 39% and not less than 27% butadiene. It has been found that films cast from polymer dispersions containing 40 or more percent butadiene, though continuous, are too soft and tacky. Dispersed polymer containing more than 73% styrene will not form continuous films—only a powder results. Continuous hard films, however, are produced from all the dispersed polymers containing no more than 39% and not less than 27% butadiene. Relatively large amounts of a persulfate as an initiator are required. At least 0.65 and preferably from 1.0 to 2.0 parts by weight of persulfate per 100 parts of monomer should be used. The polymerization systems contemplated contain very small proportions (0.02 to 2.5 parts by weight per 100 parts by weight of monomer) of emulsifier initially charged in the reactors. Suitable emulsifiers are the alkyl and alkaryl sulfonates, alkyl sulfates and salts of naphthenic acids. Polymerization in accordance with the invention is effected in either an acidic or basic system. Since, however, it is often inconvenient to use acid-resistant equipment, it is often desirable to adjust the pH of the polymerization system by buffer addition to a pH of 7.0–12.0 and preferably 8.0–10.0. Suitable buffers are $Na_2B_4O_7 \cdot 10H_2O$, $NaOH + HBO_3$, $NaBO_2$, $Na_2HPO_4$, $Na_3PO_4$, and $Na_4P_2O_7$. Other buffers may be used such as carbonates and bicarbonates.

Illustrative formulations of the invention having differing proportions of butadiene and styrene appear in Examples 1–4 which follow. Polymerization ingredients in accordance with the recipes shown in Table 1 were charged into 28 oz. crown capped glass bottles. The bottles were then capped and rotated end over end in a 50° C. water bath for 45.5 hours to produce the polymerizations shown in the table. All quantities of ingredients are shown as parts by weight.

TABLE 1

| Example No. | 1 | 2 | 3 | 4 |
|---|---|---|---|---|
| Butadiene | 65 | 70 | 75 | 80 |
| Styrene | 135 | 130 | 125 | 120 |
| Water | 300 | 300 | 300 | 300 |
| $K_2S_2O_8$ | 3.2 | 3.2 | 3.2 | 3.2 |
| $Na_2B_4O_7 \cdot 10H_2O$ | 2.0 | 2.0 | 2.0 | 2.0 |
| MP-189-S* | 0.4 | 0.4 | 0.4 | 0.4 |
| After 45.5 hours: | | | | |
| Total Solids, percent | 39.6 | 40.1 | 40.1 | 37.6 |
| Percent Conversion | 96.0 | 100.0 | 100.0 | 90.0 |
| Final pH | 8.3 | 8.4 | 8.2 | 8.9 |

*An alkyl sodium sulfonate supplied by E. I. du Pont de Nemours & Company.

Further formulations having still higher proportions of styrene were polymerized under slightly different conditions in accordance with the recipes shown in Table 2. All quantities of ingredients are shown as parts by weight.

TABLE 2

| Example No. | 5 | 6 | 7 |
|---|---|---|---|
| Butadiene | 30 | 27 | 25 |
| Styrene | 70 | 73 | 75 |
| Water | 150 | 150 | 150 |
| $K_2S_2O_8$ | 1.6 | 1.6 | 1.6 |
| $Na_2B_4O_7 \cdot 10H_2O$ | 2.3 | 2.3 | 2.3 |
| MP-189-S | 0.5 | 0.5 | 0.5 |
| Nacconol NRSF* | **2.2 | **2.2 | **2.2 |
| After 100% conversion at 70° C.: | | | |
| Time for conversion in hours | 5.8 | 5.3 | 5.4 |
| Final Total Solids, percent | 40.2 | 40.3 | 40.1 |

*An alkaryl sulfonate supplied by National Aniline Division of the Allied Chemical and Dye Corporation.
**The Nacconol was injected by a hypodermic needle into the reaction mixture at about 60% conversion.

Films were cast from the resulting aqueous polymer dispersions of Examples 1–7. Excellent continuous, clear, hard films resulted from the dispersions of Examples 1, 2, 3, 5 and 6. The film from Example 4 was somewhat soft. The film from Example 7 was brittle.

An important characteristic of the copolymer latices of the invention is the low surface value of the dispersed latex particles. The surface values of the latices may conveniently be expressed as specific surfaces. The lowest specific surface value observed for a latex of the invention was in the order of 3 square meters per gram of the dry copolymer. Many of the preferred latices possessed specific surfaces in the range of about 9 to about 43 square meters per gram, the upper limit appearing to be about 60 square meters per gram.

The improved copolymer latices of the invention possess good stability, especially mechanical stability. They may be applied, as by dipping, spraying or spreading, to most surfaces to coat the surface with a film which dries to a smooth, hard, continuous coating. The dried film is transparent or substantially transparent, and it is resistant to washing and abrasion.

The copolymer latices may be mixed with most of the common paint pigments to produce a paint or coating composition of the water dispersion type, which dries to form an opaque film. The pigments may be added as dry powders to the latex if sufficient precautions, known to the art of compounding natural rubber latex, are taken to avoid coagulating the latex. However, it is preferred to form a water dispersion of the pigments first and then to mix this dispersion carefully with the latex.

Most paint pigments are hydrophobic and require the presence of a dispersing agent for the production of a water dispersion of the pigments suitable for mixing with the latex. Many of the dispersing agents known to the colloid art may be utilized, including the various water soluble soaps, the aliphatic or aromatic sulfonates, the sulfolignins, the aliphatic sulfates, and other anionic emulsifying agents on the market; various poly-ethers, ether-alcohol condensates and other nonionic emulsifying agents; and the various hydrophilic colloidal dispersing agents, including casein, soya bean protein and other animal and vegetable proteins (including albumens) capable of reacting with an alkaline material to become dispersible in water, cellulose ethers, such as methyl cellulose, and other water dispersible cellulose derivatives, as well as other hydrophilic colloids well known in the colloid art. Two or more dispersing agents may advantageously be used in a single paint.

Typical paint pigments which may be successfully incorporated with the copolymer latex into a paint include titanium dioxide (the anatase or rutile grade is satisfactory), clay, silica, lithopone, mica, barium sulfate, talc and zinc sulfide. Many dyes and colored pigments may be included in the pigment formulation, including carbon black, iron oxides, cadmium yellows, phthalocyanines, ultramarine, chromium oxides, umber and sienna.

An example of a satisfactory paint of the flat interior type is a white paint utilizing casein as the pigment dispersing agent. It is well known in the paint industry that casein can be readily made dispersible in water by treating it with a water solution of an alkaline material, including ammonium, sodium or potassium hydroxide or an alkaline salt such as borax, sodium or potassium carbonate. For example, 10 parts of dry casein are added to 56 parts, by weight, of soft water, and the mixture is allowed to stand at ordinary room temperature for 30 to 60 minutes. Then the mixture is stirred and warmed to about 60° C. One part of borax is added to the warm mixture with stirring, and the mixture is stirred for an additional 30 minutes at 60° C. The casein dispersion is allowed to cool. Preferably a fungicide is added to the casein dispersion to protect it and the resulting paint from the mold, etc.; e. g., 2 to 3 parts of a 20% solution of Dowicide A* (and a corresponding reduction of the original water, employed for dispersing the casein, from 56 to 53 or 54 parts) may be added to the cool casein dispersion.

A paint may be prepared in accordance with the following formula:

| Ingredients: | Parts by weight |
| --- | --- |
| Pigment(s) | 20 to 40 |
| Water | 14 to 30 |
| Casein dispersion | 1 to 10 |
| Antifoaming agent | 0.75 to 3 |
| Copolymer latex | 20 to 55 |

A somewhat more detailed formula may be:

| Ingredients: | Parts by weight |
| --- | --- |
| Titanium dioxide | 2 to 25 |
| Lithopone | 3 to 12 |
| Silica and silicates | 4 to 12 |
| Color (if desired) | 3 to 12 |
| Water | 14 to 30 |
| Protein—dry (as a dispersion) | 1 to 3 |
| Antifoaming agent | 0.75 to 3 |
| Polymerized oil | 1 to 6 |
| Copolymer latex | 25 to 55 |

The ingredients may be chosen in the ranges shown in the above formulas, depending upon the specific paint properties desired. The paint may be prepared by mixing the ingredients in a can by means of a conventional paddle stirrer. The water preferably containing about one percent of $Na_4P_2O_7$ or other soluble phosphate as a pigment dispersant, is stirred while the pigments or mixture of pigments is added. The mixture is stirred for several minutes to insure thorough wetting of the pigment. Then the casein dispersion is added and the mixture is stirred until uniform in appearance. An antifoaming agent, such as pine oil, tributyl phosphate or similar oily antifoamer is then added. Additional fungicide, amounting to 1 to 2 parts, may be added at this point to improve the resistance of the paint to fungi attack. Then the copolymer latex is carefully added, with slow stirring, so as to avoid formation of foam, and the paint is slowly stirred for an additional period of 15 to 30 minutes. The mixed paint may then be filtered, if desired, and is ready for use or packaging.

Dispersion paints, since they contain water, necessarily freeze when they are subjected to low temperatures, as for example temperatures normally occurring during the winter. Aqueous polymer dispersions, ordinarily available commercially, coagulate when allowed to thaw after having been frozen despite additions of known stabilizers. Dispersion paints containing such polymer dispersions, if frozen and thawed, will also tend to coagulate, and thus cannot be brushed or otherwise applied to a surface to be painted. Shipping and storing of such paints must, therefore, be carefully regulated in order to prevent freezing of the paint. Freeze stability of a dispersion paint containing an aqueous polymer dispersion has been found often to follow the freeze characteristics of the aqueous polymer dispersion.

Aqueous polymer dispersions prepared in accordance with the many specific and critical conditions of the present invention can be stabilized by known emulsifiers to produce not only mechanically stable but also freeze stable dispersions. Suitable emulsifiers for this purpose may be selected from the anionic emulsifiers, nonionic emulsifiers and mixtures of anionic and nonionic emulsifiers. Excellent dispersion paints which are also freeze stable may be prepared by incorporating paint pigments into these stabilized polymer dispersions.

In the specific examples which follow, freeze stabilities of polymer dispersions were determined by placing 50 ml. samples of the polymer dispersions in 125 ml. Erlenmeyer flasks. The flasks were then stoppered and placed in a freezing chamber where they were maintained at −18° C. for 3 hours. The flasks were then removed from the freezing chamber and the frozen contents allowed to thaw at room temperature. The contents were then observed to determine their freeze characteristics. Poor freeze characteristics were reflected by coagulation of the polymer dispersion. A polymer dispersion having good freeze stability did not coagulate but remained mobile and fluid.

Freeze stability of dispersion paints containing aqueous polymer dispersions was determined in a somewhat similar manner as follows: Thirty grams of dispersed pigment and 20 g. of stabilized aqueous polymer dispersion were weighed into ¼ pint metal cans. Viscosity of the resulting paint was adjusted by adding water until the paint possessed a viscosity of 6 seconds as measured in a conical brass cup, capacity 90 ml., with a bottom orifice 0.277 inch in diameter. Viscosity according to this test was determined by filling the cup with paint and measuring the time in seconds required for the paint to flow through the cup orifice until the stream of paint broke. The metal cans were covered and placed in a freezing chamber where they were maintained at −30° C. for 16 hours. The cans were then removed from the freezing chamber and the contents allowed to thaw at room temperature. When the contents of the cans had reached room temperature, the contents were observed in order to determine their freeze characteristics. If the contents had coagulated, the paint had failed the test. If the contents had not coagulated, freeze characteristics were evaluated by observing viscosity and grain (floc) presence. Increased viscosity and increased amounts of grain indicated decreasing freeze stability. When freeze characteristics had been observed after one freezing and thawing cycle, the cans were again covered and the contents subjected to succeeding identical cycles until the contents coagulated or exhibited poor stability, or had been subjected to four freezing cycles. Some freeze stability is reflected by a paint which does not coagulate after one cycle. Exceptional freeze stability is reflected by a paint which has a viscosity of no more than 30 seconds and contains no grain after 4 freezing cycles.

*Freeze stable polymer dispersions*

Representative specific examples of polymerizations

---

* Sodium salt of ortho-phenyl phenol.

of the invention were carried out in accordance with the polymerization formulae shown in Table 3. All of these formulae include, additionally, butadiene and styrene in the ratio 37:63 parts by weight. The proportion of persulfate catalyst utilized in these polymerizations was essentially the only variant. The proportions of borax represent only the theoretical quantities required to neutralize free acid formed during polymerization. All polymerizations were made at 70° C. All quantities are shown as parts by weight per 100 parts of monomer.

After polymerization was completed, each of the resulting polymer dispersions was further stabilized by adding thereto a mixture of emulsifying agents consisting of 1.2 parts by weight per 100 parts of polymer of Nacconol NRSF and 1.0 part by weight of each of the following: Triton X-100 [1], GMR-S [2] and ammonium oleate. Freeze characteristics of the thus stabilized polymer dispersions were determined according to the procedure outlined above and are also recorded in Table 3.

sion to add additional emulsifier at some time late in the polymerization in order to produce a more stable polymer dispersion. It has been found possible to make such an increment addition of emulsifier without detracting from the freeze stability, provided the addition is not made earlier than about 50% conversion.

A plant scale polymerization was made of the following initial ingredients:

| | Parts by weight |
|---|---|
| Butadiene | 37 |
| Styrene | 63 |
| $K_2S_2O_8$ | 1.2 |
| MP-189-S | 0.56 |
| $Na_2B_4O_7.10H_2O$ | 1.48 |
| Water initially charged | 145 |

Polymerization was effected at 70° C. At about 60% conversion 2.2 parts by weight of Nacconol NRSF was injected into the reactor and polymerization completed. A small amount of unreacted butadiene was removed from the resulting latex by stripping in accordance with

TABLE 3

| Example No. | $K_2S_2O_8$ | MP-189-S* | $Na_2B_4O_7.10H_2O$ | Water | Specific Surface sq.m./g. dry polymer | Specific Characteristics |
|---|---|---|---|---|---|---|
| 8 | 1.3 | 0.1 | 1.8 | 120 | 35.1 | Good. |
| 9 | 1.6 | 0.1 | 2.3 | 120 | 29.1 | Do. |
| 10 | 2.0 | 0.1 | 2.8 | 120 | 22.3 | Do. |

* An alkyl sodium sulfate supplied by E. I. du Pont de Nemours & Company.

Additional polymerizations in accordance with the invention were made with the recipes shown for Examples 11 to 17 inclusive set out in Table 4. All polymerizations contained butadiene and styrene in the ratio 37:63 and all polymerizations were carried out in the presence of 1.6 parts by weight of $K_2S_2O_8$. Essentially the only variant was the amount of emulsifier initially charged in the reactors. All quantities are shown as parts by weight for 100 parts of monomer. After polymerization, each of the resulting polymer dispersions was further stabilized by the addition thereto of 2.2 parts of Nacconol NRSF and 5.0 parts of morpholinium salt of Resin 731*. Freeze characteristics were examined and are also recorded in Table 4.

commercial synthetic rubber practice. The polymerized dispersion possessed a pH of 8.8. The specific surface of the dispersion was 38.5. Samples of the resulting polymer dispersion were further stabilized by the addition of a stabilizing mixture of emulsifying agents consisting of 1.0 part by weight per 100 parts of polymer of each of the following: Triton X-100, GMR-S, and ammonium oleate. When the resulting stabilized dispersions were subjected to the previously outlined freeze tests they were found to be very fluid and mobile.

*Freeze stable paints*

Dispersion paints were produced by adding the stabilized polymer dispersions of Examples 8, 9, 10 and 18

TABLE 4

| Example No. | MP-189-S | Temperature, °C. | $Na_2B_4O_7.10H_2O$ | Water | Time for Complete Conversion in Hours | Percent Final Total Solids | Freeze Characteristics of Stabilized Polymer Dispersions |
|---|---|---|---|---|---|---|---|
| 11 | 0.02 | 65 | 1.2 | 150 | 16.0 | | Good. |
| 12 | 0.10 | 70 | 2.3 | 120 | 10.5 | 44.5 | Do. |
| 13 | 0.30 | 70 | 2.3 | 120 | 8.0 | 44.1 | Do. |
| 14 | 0.50 | 70 | 2.3 | 120 | 8.0 | 44.4 | Do. |
| 15 | 0.75 | 70 | 2.3 | 120 | 8.0 | 45.8 | Do. |
| 16 | 1.00 | 70 | 2.3 | 120 | 8.0 | 44.9 | Do. |
| 17 | 1.30 | 70 | 2.3 | 120 | 9.5 | 45.0 | Do. |

A control polymerization containing no emulsifier, but other ingredients and conditions identical with Example 11, required 39 hours for polymerizing to complete conversion. Referring to Table 4, it can be seen that very short reaction times result from the small amounts of emulsifiers initially charged into a reactor in accordance with the invention. Stabilized polymer dispersions from all of the examples possessed excellent freeze characteristics and remained mobile and fluid after the rigorous freeze tests.

EXAMPLE 18

It has been found desirable in order to obtain freeze stable polymer dispersions to keep the amount of emulsifier initially charged into a polymerization reactor at a minimum. However, it may be advantageous on occato paint pigment dispersions prepared in accordance with the detailed discussion above. The resulting paints were examined for freeze stability according to the previously outlined procedure. Freeze characteristics of the paints produced from Examples 8, 9, 10 and 18 are shown respectively in Table 5 under the headings of Examples 19-22.

TABLE 5

*Paint freeze characteristics*

| Example No. | 1st Freeze Cycle | Subsequent Freeze Cycles |
|---|---|---|
| 19 | fluid, no grain | slightly viscous, no grain after 4th cycle. |
| 20 | do | Do. |
| 21 | do | Do. |
| 22 | do | moderately viscous, no grain after 4th cycle. |

[1] An alkyl aryl polyether alcohol which is a nonionic emulsified and is supplied by Rohm & Haas Company.
[2] A soap modified glyceryl monoricinoleate supplied by Glyco Products Company.
* Resin 731 is a disproportionated rosin supplied by Hercules Powder Company.

Other dispersion paints were prepared by mixing paint pigment dispersions with aqueous polymer dispersions produced by polymerizing the ingredients shown in Table 6. All of the Examples 23–26 contained butadiene and styrene in the ratio 37:63 and were polymerized at 70° C. Two and two tenths percent Nacconol NRSF was injected into the reactors during all of these polymerizations at 60–75% conversion. Final total solids of the resulting polymer dispersions were in the range 40–45%. After polymerization was complete, the polymer dispersions of Examples 24 and 26 were further stabilized by the addition thereto of 1.5 parts by weight of Triton X–100 and 1.5 parts by weight of Antarox A–400*, both per 100 parts by weight of polymer. The dispersions of the other examples were stabilized after polymerization by the stabilizing mixture used in Example 18. Freeze characteristics of the resulting paints were determined and are also shown in Table 6.

TABLE 6

| Example No. | $K_2S_2O_8$ | MP-189-S | $Na_2B_4O_7.10H_2O$ | Water initially charged | Specific Surface, sq. m./g. Polymer | First Freeze Cycle | Later Freeze Cycles |
|---|---|---|---|---|---|---|---|
| 23 | 1.0 | 0.47 | 1.23 | 145 | 30.0 | Viscous, very slight grain. | Coagulated after second cycle. |
| 24 | 1.3 | 0.3 | 1.8 | 110 | 33.2 | Fluid, no grain | Mobile without agitation, fluid and no grain after 4th cycle. |
| 25 | 1.6 | 0.8 | 2.2 | 130 | 32.8 | ----do---- | Do. |
| 26 | 1.6 | 2.5 | 2.3 | 120 | 9.6 | ----do---- | Moderately viscous, no grain after 4th cycle. |

Two additional dispersion paints were prepared by mixing paint pigment dispersions with aqueous polymer dispersions produced in accordance with the recipe and conditions of Example 18 except for further stabilization after polymerization. One of the polymer dispersions (Example 27) was further stabilized by the addition of a stabilizing mixture consisting of 3.0 parts of Triton X–100 and 3.0 parts of ammonium salt of Resin 731, both by weight per 100 parts of polymer. The paint produced from this stabilized polymer dispersion was only slightly viscous and contained no grain after 4 freezing cycles. The other polymer dispersion (Example 28) was further stabilized after polymerization by the addition of a stabilizing mixture consisting of 3.0 parts of Triton X–100 and 3.0 parts of the ammonium salt of linseed oil fatty acid, both by weight per 100 parts of polymer. The paint produced from this stabilized polymer dispersion was mobile without agitation, fluid and had no grain after 4 freezing cycles.

Surprisingly, the further stabilized polymer dispersions of Examples 27 and 28 were found to be stable to multivalent metal ions. It was found that substantial amounts of divalent calcium in the form of calcium chloride and substantial amounts of trivalent aluminum in the form of alum could be added to these dispersions without coagulating the dispersions. Stability of a polymer dispersion to multivalent metal ions is particularly advantageous in a dispersion to be used in producing paint, since a much wider variety of paint pigments may be incorporated in such a dispersion without coagulation. The addition of nonionic emulsifier after completion of polymerizations in accordance with the invention appears to be responsible for this desirable result.

Polymer dispersions which produce paints having very little freeze resistance may sometimes be substantially improved by slight alterations of the stabilizing mixture added to the dispersions after polymerizations. Examples 29 and 30 illustrate this fact. The following ingredients were charged into a plant reactor:

Parts by weight
Butadiene _____ 37
Styrene _____ 63
$K_2S_2O_8$ _____ 0.65
$Na_2B_4O_7.10H_2O$ _____ 0.8
MP–189–S _____ 0.1
Water _____ 150

Polymerization was effected at 70° C. During polymerization Nacconol NRSF was injected into the reactor as follows: 0.2 part by weight at 23% total solids, 0.2

\* An alkyl aryl polyether alcohol, a nonionic emulsifier supplied by General Aniline & Film Corporation.

part by weight at 33% total solids and 0.6 part by weight at 38.7 total solids. Polymerization was completed; the unreacted butadiene was stripped; and 1.0 part by weight of Triton X–100 was added to the polymer dispersion.

Separate portions of the resulting dispersion were further stabilized by adding the following mixtures of emulsifiers:

Parts by weight per 100 parts of polymer
Example 29:
  GMR–S _____ 1.0
  Ammonium oleate _____ 1.0
Example 30:
  GMR–S _____ 1.0
  Ammonium oleate _____ 1.0
  Glyceryl monoricinoleate _____ 2.0

The stabilized polymer dispersions of Examples 29 and 30 were then mixed with identical paint pigment dispersions and the resulting paints were subjected to the freeze test. The freeze characteristics follow:

| | 1st Freezing Cycle | Later Freezing Cycles |
|---|---|---|
| Example 29 | Viscous, slight grain | Coagulated on second cycle. |
| Example 30 | Moderately viscous, trace of grain. | Viscous, heavy grain after third cycle. |

The paint of Example 30 was considerably more freeze resistant than the paint of Example 29. Another stabilizing mixture very suitable for addition after polymerization consists of 1.5 to 3.0 parts by weight of Triton X–100 and 3.0 parts by weight of ammonium salt of Resin 731. Outstanding paints have resulted when the last stabilizing mixture was substituted for a Triton-GMR-S-ammonium oleate mixture in a polymer dispersion otherwise produced in accordance with Example 18. Still other mixtures of anionic and/or nonionic emulsifying agents readily apparent to those skilled in the art may also be utilized without in any way departing from the spirit of the invention, since slight variations of conditions and pigments incorporated will call for slight adjustments in stabilization.

Effects of varied stabilization of polymer dispersions on the freeze characteristics of paints containing such dispersions are further illustrated by Examples 31–36 which follow. Ingredients in accordance with the following recipes were charged into 28 oz. crown capped glass bottles:

| | Parts by weight | |
|---|---|---|
| | Example 31 | Example 32 |
| Butadiene | 37 | 37 |
| Styrene | 63 | 63 |
| MP–189–S | 0.3 | 0.3 |
| $K_2S_2O_8$ | 1.6 | 1.6 |
| $Na_2B_4O_7.10H_2O$ | 2.4 | |
| $Na_4P_2O_7$(anhydrous) | | 1.7 |
| Water | 150 | 150 |

The bottles were then capped and rotated end over end in a 70° C. water bath for 8 hours. The conversions of Examples 31 and 32 were respectively 95.5% and 97.0%. The final total solids of the polymer dispersions were respectively 39.4% and 39.9%.

A portion of the polymer dispersion of Example 31 was further stabilized by adding a mixture of emulsifiers consisting of 1.5 parts by weight per 100 parts of polymer of each of the following: Triton X-100 and Antarox A-400. T' ; thus stabilized polymer dispersion was then mixed with a paint pigment dispersion. Freeze characteristics of the resulting paint were then determined and appear in Table 7 under the designation of Example 33.

Another portion of the polymer dispersion of Example 31 was fur*'\er stabilized by adding a mixture of emulsifiers consisting of 2.2 parts by weight of Nacconol NRSF, 1.5 parts by weight of Triton X-100 and 1.5 parts by weight of Antarox A-400 (all based on 100 parts of polymer). The thus stabilized polymer dispersion was mixed with a paint pigment dispersion identical with that used in preparing Example 33. The freeze characteristics of the resulting paint appear in Table 7 under the designation of Example 34.

A paint was prepared from a portion of the polymer dispersion of Example 32 by emulsifier and paint pigment dditions identical with those used in preparing Example 33. The freeze characteristics of this paint appear in Table 7 under the designation of Example 35. Similarly, a paint was prepared from another portion of the polymer dispersion of Example 32 by emulsifier and paint pigment dispersion additions identical with those used in preparing Example 34. The freeze characteristics of this paint appear in Table 7 under the designation of Example 36.

to four freezing cycles of a test modified from the test previously described only in that freezing was effected at —25° C. According to the previously described method, viscosity in seconds was determined in the previously described conical brass cup for each of the paints prior to freezing and after each of the four freezing cycles. The results of these freeze tests are reported in Table 8.

TABLE 8

*Effect of freezing on paint viscosity*

| Example No. | Viscosity in Seconds | | | | |
|---|---|---|---|---|---|
| | Original | 1st Cycle | 2nd Cycle | 3rd Cycle | 4th Cycle |
| 37 | 5.2 | 6.4 | 7.0 | 7.4 | 10.0 |
| 38 | 10.2 | 10.9 | 10.2 | 10.2 | 12.3 |
| 39 | 11.3 | 8.8 | 7.9 | 8.1 | 8.3 |
| 40 | 9.8 | 13.0 | 14.7 | 14.7 | 11.5 |

Referring to the data of Table 8, it is apparent that the viscosities of the paints produced from Examples 37–40 were only slightly affected by long periods of freezing. The viscosities, even after four freezing cycles, were all well within desired limits. None of these paints contained grain even after the fourth cycle.

TABLE 7

*Paint freeze characteristics*

| Example No. | 1st Freeze Cycle | 2nd Freeze Cycle | 3rd Freeze Cycle | 4th Freeze Cycle |
|---|---|---|---|---|
| 33 | slightly viscous, no grain | moderately viscous, no grain | viscous, no grain | viscous, slight grain. |
| 34 | fluid, no grain | slightly viscous, no grain | slightly viscous, no grain | slightly viscous, no grain. |
| 35 | mobile without agitation, fluid, no grain. | ____do____ | moderately viscous, no grain | moderately viscous, slight grain. |
| 36 | ____do____ | mobile without agitation, fluid, no grain. | fluid, no grain | fluid, no grain. |

Referring to Table 7, it can be seen that the paints of Examples 33 and 35, though they did not coagulate and showed only slight grain after four freezing cycles, did become viscous. The paint of Example 34, prepared from the same polymer dispersion used in preparing the paint of Example 33, was however only slightly viscous after four freezing cycles. The improved freeze stability resulted from the additional emulsifier (2.2 parts of Nacconol NRSF) used in stabilizing the polymer dispersion. Similarly, the freeze characteristics of the paint of Example 36 were substantially better than those for the corresponding paint of Example 35.

Still further illustrations of stable polymer dispersions and paints resulting therefrom are presented by the following additional examples. Another plant scale polymerization was made in accordance with the proportions of ingredients and conditions of the polymerization of Example 18 except that 135 parts of water were initially charged.

Separate portions of the resulting polymer dispersion were further stabilized by adding the following mixtures of emulsifiers:

Parts by weight per 100 parts of polymer

Example 37:
  Triton X-100 _____ 3.0
  Ammonium salt of linseed oil fatty acid_____ 3.0
Example 38:
  G 3300 [1] _____ 3.0
  Ammonium salt of linseed oil fatty acid_____ 3.0
Example 39:
  Antaron L 114 [2] _____ 3.0
  Ammonium salt of linseed oil fatty acid_____ 3.0
Example 40:
  Aliphatic ester sulfate [3] _____ 3.0
  Ammonium salt of linseed oil fatty acid_____ 3.0

[1] A mixed anionic and nonionic emulsifier supplied by Atlas Powder Company, Wilmington, Delaware.
[2] An anionic emulsifying agent supplied by General Aniline and Film Corporation, New York, New York.
[3] Supplied by Onyx Chemical Company, Jersey City, New Jersey.

Paints were produced by mixing identical paint pigment dispersions with the stabilized polymer dispersions of Examples 37–40. Each of the resulting paints was subjected

EXAMPLE 41

Another plant scale polymerization was carried out by charging the following ingredients into a reactor:

Parts by weight
Butadiene _____ 37
Styrene _____ 63
$K_2S_2O_8$ _____ 1.2
MP-189-S _____ 0.56
$Na_2B_4O_7.10H_2O$ _____ 1.48
Water initially charged _____ 135

Polymerization was effected at 70° C. At about 60% conversion 2.2 parts by weight of Nacconol NRSF per 100 parts of monomers was injected into the reactor and polymerization completed. A small amount of unreacted butadiene was removed from the resulting latex by stripping. The specific surface of the latex was 42.5 square meters per gram of polymer. The latex was further stabilized by the addition thereto of 3.0 parts by weight of Triton X-100 and 3.0 parts by weight of ammonium salt of Resin 731, both per 100 parts by weight of polymer.

A paint was produced by admixing the above stable latex with a paint pigment dispersion. The freeze characteristics of the paint were determined according to the procedure used in Examples 19–36 and are reported as follows:

*1st freeze cycle.*—Mobile without agitation, fluid, no grain.
*4th freeze cycle.*—Mobile without agitation, fluid, no grain.

EXAMPLE 42

Still another plant scale polymerization was carried out by charging the following ingredients into a reactor:

Parts by weight
Butadiene _____ 37
Styrene _____ 63
$K_2S_2O_8$ _____ 1.2
MP-189-S _____ 0.42
$Na_2B_4O_7.10H_2O$ _____ 1.48
Water initially charged _____ 135

As in Example 41, polymerization was effected at 70° C., 2.2 parts of Nacconol NRSF was injected into the reactor at about 60% conversion and unreacted butadiene was stripped after completion of the polymerization. The specific surface of the resulting latex was 40.75 square meters per gram of polymer. The latex was further stabilized by the addition thereto of 3.0 parts by weight of Triton X-100 and 3.0 parts by weight of ammonium salt of linseed oil fatty acid.

A paint was produced by admixing this latex with a paint pigment dispersion. Freeze characteristics of the resulting paint were determined by subjecting the paint to four freezing cycles at −25° C. and the viscosity observed after each freezing cycle according to the procedure used in Examples 37-40. After four freezing cycles, the paint contained no grain. The viscosities were as follows:

| | Viscosity, seconds |
|---|---|
| Original viscosity | 5.3 |
| 1st freezing cycle | 7.2 |
| 2nd freezing cycle | 7.0 |
| 3rd freezing cycle | 7.2 |
| 4th freezing cycle | 8.9 |

This paint also had excellent freeze stability.

EXAMPLES 43-52

A plant scale polymerization similar to Example 42 was carried out, except that 1.3 parts of potassium persulfate was employed and 0.3 part of Nacconol was substituted for the MP-189-S. No additional emulsifier was injected during polymerization. After polymerization samples of the resulting latex were stabilized by addition of varying amounts and types of emulsifying agents, as is shown in Table 9. The stabilized latices in accordance with Table 9 were each mixed with a standard paint pigment masterbatch as in previous examples, and the resulting paints were frozen and thawed as before. The thawed paints were all satisfactorily fluid and possessed viscosities of less than 30 seconds. On the other hand a sample of the original latex containing no added emulsifying agent was mixed with a portion of the standard paint pigment masterbatch to produce a control paint; this control paint coagulated upon freezing and thawing, thus failing the freeze test.

noted that the small amount of borax included in the above recipe was insufficient to have an appreciable buffering action. Thus, the pH of the resulting latex was quite low. For convenience in packaging, commercial paints are ordinarily neutral or alkaline. Consequently the pH of the latex was increased to 9.4 by addition thereto of ammonium hydroxide (28%). When it is desired to increase the pH of acidic latices of the invention, any of the conventional alkaline reagents are suitable, especially morpholine, ammonia or triethanolamine; a stronger base, such as KOH, can be used if suitable precautions are taken, as are known to those skilled in the rubber latex art. The latex was additionally stabilized by addition of 2.2 parts by weight of Nacconol NRSF, 3.0 parts by weight of Triton X-100 and 2.0 parts by weight of ammonium salt of linseed oil fatty acid, all per 100 parts by weight of polymer in the latex. The thus stabilized polymer latex was mixed with an aqueous pigment dispersion to produce a paint. The paint was subjected to three freezing cycles at −25° C. and the viscosity of the paint after each of the freezing cycles was determined in accordance with the procedure used in Examples 37-40 and 42. The paint was freeze-stable and after three complete freezing and thawing cycles contained no grain. The viscosities after the various freezing cycles were as follows:

| | Viscosity, seconds |
|---|---|
| Original viscosity | 12.0 |
| 1st freezing cycle | 29.0 |
| 2nd freezing cycle | 31.0 |
| 3rd freezing cycle | 32.0 |

In addition to the general discussion of the invention set forth in the early part of this specification, experience gained in conducting the specific examples of the invention reported above and also in conducting numerous additional experiments has made it clear that it may be further characterized as follows:

Other water soluble salts of persulfuric acid may be successfully employed in lieu of the potassium persulfate of the examples, including sodium, lithium and ammonium persulfates.

TABLE 9

Emulsifiers added after 50% conversion

| Example No. | Parts Nacconol NRSF | Parts Triton X-100 | Parts Ammonium Linseed Oil Fatty Acid | Parts Triton X-114* | Parts Igepal CO 530** | Total Parts Emulsifiers |
|---|---|---|---|---|---|---|
| 43 | 1.0 | 0.9 | 0.6 | | | 2.5 |
| 44 | 0.5 | 1.2 | 0.8 | | | 2.5 |
| 45 | 0.5 | | | 2.0 | | 2.5 |
| 46 | 0.5 | | | | 2.0 | 2.5 |
| 47 | | | | | 2.5 | 2.5 |
| 48 | | | | 2.5 | | 2.5 |
| 49 | 0.33 | 0.8 | 0.54 | | | 1.67 |
| 50 | 0.17 | 0.4 | 0.27 | | | 0.84 |
| 51 | | | | 1.67 | | 1.67 |
| 52 | | | | 0.84 | | 0.84 |

*A non-ionic emulsifier supplied by Rohm & Haas Company and described as octyl-phenoxy-polyethoxy-ethanol.
**A non-ionic emulsifier supplied by General Aniline & Film Corporation and described oxyethylated nas a polyonylphenol.

EXAMPLE 53

As an illustration of production of a paint in accordance with the invention from a latex produced by polymerization in an acid system, ingredients in accordance with the following recipe were charged into a polymerization reactor:

| | Parts by weight |
|---|---|
| Butadiene | 37.0 |
| Styrene | 63.0 |
| Aquarex G* (100%) | 0.1 |
| $K_2S_2O_8$ | 1.3 |
| $Na_2B_4O_7 \cdot 10H_2O$ | 0.2 |
| Water | 125.0 |

* An alkyl sodium sulfonate supplied by E. I. du Pont de Nemours & Co.

Polymerization of the above ingredients was effected at 70° C. and was complete after nine hours. The final total solids of the resulting latex was 43.8%. The pH of the latex was 1.95. In this regard it should be In addition to the specific examples and types of anionic emulsifiers mentioned above as suitable for incorporating initially in the polymerization recipe, any of the available anionic emulsifiers may be used, including the ordinary soaps (either sodium or potassium soaps) sodium or potassium rosin soaps, and the like. Soaps as initial emulsifiers, however, have been found to result in slower polymerization rates. Consequently, the other anionic emulsifiers are to be preferred. As a preferred range, within the broader range of 0.02 to 2.5 parts, the range of 0.1 to 1.3 parts of initial anionic emulsifying agent has been found to result in especially rapid rates of polymerization and to produce latices of relatively high inherent stability.

Polymerization modifiers such as the various aliphatic mercaptans and mixtures thereof, when included in polymerization recipes otherwise in accordance with the invention, have been found to impair the freeze characteristics of paints produced from the resulting latices. Additionally, the presence of such modifiers greatly retards the polymerization rate and tends to cause undesirable floc. The use of these polymerization modifiers should, therefore, be avoided.

Although the examples relate to copolymers of styrene and 1,3-butadiene only, the mono and di-vinyl benzenes and other 1,3-butadienes may be used as the monomers. The styrenes contemplated are the known derivatives of styrene, including alpha-methylstyrene, the nuclear-substituted styrenes, the various known chlorostyrenes, vinyl toluene and the like. Also contemplated are other known conjugated diolefins, especially including isoprene.

If desired, cross-linking agents may be included in the polymerization formulae of the invention. Di-vinyl benzene has, for example, been successfully included without lowering the rate of conversion or affecting the stability of the resulting aqueous polymer dispersions. The cross-linking agent may be either initially charged into the reactor or it may be subsequently added during polymerization.

The stable latex of the invention, as polymerized, is characterized by a total solids content in the range of 35 to 50% by weight, and preferably in the range of 40 to 50%. The operative range of the proportion of water initially charged is 90 to 150 parts water per 100 parts total monomers, by weight.

The latex of the invention is characterized by its low particle surface values, as is brought out by the discussion of the specific surface ranges in the early part of this specification. This characteristic of the latex is important in that relatively less stabilizing emulsifying agent is required to make it freeze stable. A resulting copolymer film, or paint film from a water dispersion paint embodying the latex, is more resistant to water and abrasion than comparable films derived from prior latices which required relatively large proportions of hydrophilic emulsifying agents for their mechanical stabilization. Paints of the invention are particularly water resistant if the stabilizing emulsifying agents contained therein include a fugitive soap. A fugitive soap behaves like an ordinary sodium or potassium soap in a water solution, but when such solution is dried the soap gradually decomposes because of evaporation of the cation forming portion thereof. Suitable fugitive soaps are illustrated in the preceding examples and include ammonium and substituted ammonium soaps of various carboxylic acids such as the fatty acids, the rosin acids, the disproportionated rosin acids, the hydrogenated rosin acids and the like, e. g. ammonium oleate, ammonium and morpholinium soaps of rosin acids, ammonium soap of linseed oil fatty acids, and the like. The presence of a soluble phosphate, such as $Na_4P_2O_7$, is desirable in a water dispersion paint to improve its freeze stability, as is brought out above.

Other polymerization reaction temperatures than those shown in the examples have been successfully employed, for example, in the range of 60 to 90° C. Other experiments have made it quite clear that this temperature range should be extended to include the broader range of 40 to 125° C. as the preferred polymerization temperature range for the process of the invention.

The various examples show the production of freeze-stable latex and paint, according to the invention, by addition of a relatively small quantity of two or more emulsifying agents or of a non-ionic emulsifying agent to the resin latex after 50% polymerization conversion. The examples teach the successful use of less than 1% of added emulsifier(s) based upon the polymer content of the latex, or of several percent in many instances. The total amount of emulsifier(s) added depends upon a number of factors, e. g., a latex possessing a smaller specific surface value requires less added emulsifier to protect it against freezing than a similar latex having a larger specific surface value; exceptional freeze stability requires the addition of more emulsifier than is required for protection against a single freeze; in general, water resistance of a paint film is improved by use of the minimum quantity of added emulsifier necessary to give the latex and resulting paint the desired freeze resistance.

Changes in the specific details and proportions of ingredients given in the examples may be made without departing from the spirit and scope of the invention, as will be apparent to those skilled in the arts to which this invention is directed.

What is claimed is:

1. A freeze stable water dispersion paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, and water-disposed paint pigment admixed with the latex, said paint pigment being water-dispersed by a pigment dispersing agent and said dispersion paint containing a relatively small quantity of more than one additional stabilizing emulsifying agent added to said latex after 50% polymerization conversion and before admixing with said water-dispersed paint pigment, the additional emulsifying agents being selected from the group consisting of anionic and nonionic emulsifiers.

2. A freeze stable water dispersion paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, the latex characterized by a specific surface in the range of 3 to 60 square meters per gram of dry copolymer, and water-dispersed paint pigment admixed with the latex, said paint containing a relatively small quantity of more than one additional stabilizing emulsifying agent added to said latex after 50% polymerization conversion and before admixing with said water-dispersed paint pigment, at least one of the additional emulsifying agents being an anionic emulsifier.

3. A freeze stable water-dispersion paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, the latex characterized by a specific surface in the range of 3 to 60 square meters per gram of dry copolymer, and water-dispersed paint pigment admixed with the latex, said paint containing a relatively small quantity of more than one additional stabilizing emulsifying agent added to said latex after 50% polymerization conversion and before admixing with said water-dispersed paint pigment, at least one of the additional emulsifying agents being a nonionic emulsifier.

4. A freeze stable water dispersion paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, the latex characterized by a specific surface in the range of 3 to 60 square meters per gram of dry copolymer, and water-dispersed paint pigment admixed with the latex, said paint containing a relatively small quantity of a mixture of nonionic and anionic emulsifying agents added to said latex after 50% polymerization conversion and before admixing with said water-dispersed paint pigment.

5. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, the latex characterized by a specific surface in the range of 3 to 60 square meters per gram of dry copolymer, said latex containing a relatively small quantity of more than one additional stabilizing emulsifying agent added to the latex after 50% polymerization conversion, the additional emulsifying agents being selected from the group consisting of anionic and nonionic emulsifiers.

6. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, the latex characterized by a specific surface in the range of 3 to 60 square meters per gram of dry copolymer, said latex containing a relatively small quantity of more than one additional stabilizing emulsifying agent, the additional emulsifying agents including at least one additional anionic emulsifying agent added to the latex after 50% polymerization conversion.

7. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, the latex characterized by a specific surface in the range of 3 to 60 square meters per gram of dry copolymer, said latex containing a relatively small quantity of more than one additional stabilizing emulsifying agent, the additional emulsifying agents including at least one nonionic emulsifying agent added to the latex after 50% polymerization conversion.

8. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, the latex characterized by a specific surface in the range of 3 to 60 square meters per gram of dry copolymer, said latex containing a relatively small quantity of a mixture of anionic and nonionic emulsifying agents added to the latex after 50% polymerization conversion.

9. A method of producing a freeze stable water-dispersion paint comprising polymerizing 61 to 73% by weight of a styrene with correspondingly 39 to 27% of a conjugated diolefin, in aqueous emulsion in the presence of about 1.0 to 2.0 parts of a soluble salt of persulfuric acid and 0.02 to 2.5 parts initial charge of an anionic emulsifying agent per 100 parts by weight of monomers to produce a latex, adding a relatively small quantity of more than one additional stabilizing emulsifying agent to said latex and thereafter admixing said latex with a water-dispersed paint pigment, the additional emulsifying agents being added after 50% polymerization conversion and being selected from the group consisting of anionic and nonionic emulsifiers.

10. A method of producing a freeze stable latex comprising polymerizing 61 to 73% by weight of a styrene with correspondingly 39 to 27% of a conjugated diolefin, in aqueous emulsion in the presence of about 1.0 to 2.0 parts of a soluble salt of persulfuric acid and 0.02 to 2.5 parts initial charge of an anionic emulsifying agent per 100 parts by weight of monomers to produce a latex and adding a relatively small quantity of more than one additional stabilizing emulsifying agent to said latex after 50% polymerization conversion, the additional emulsifying agents being selected from the group consisting of anionic and nonionic emulsifiers.

11. A freeze stable latex of an aqueous emulsion copolymer of about 63% by weight of styrene and about 37% 1,3-butadiene polymerized in the presence of 1.0 to 2.0 parts of potassium persulfate, 0.1 to 1.3 parts initial charge of an anionic emulsifying agent and 90 to 150 parts initial charge of water, per 100 parts by weight of monomers, the polymerization conducted in the pH range of 8.0 to 10.0 and the total solids of the latex being in the range of 40 to 50% by weight, said latex containing a relatively small quantity of more than one additional stabilizing emulsifying agent, the additional emulsifying agents being added to the latex after about 50% polymerization conversion and the additional emulsifying agents being selected from the group consisting of anionic and nonionic emulsifiers.

12. A freeze stable latex of an equeous emulsion copolymer of about 63% by weight of styrene and about 37% 1,3-butadiene polymerized in the presence of 1.0 to 2.0 parts of potassium persulfate, 0.1 to 1.3 parts initial charge of an anionic emulsifying agent and 90 to 150 parts initial charge of water, per 100 parts by weight of monomers, the polymerization conducted in the pH range of 8.0 to 10.0 and the total solids of the latex being in the range of 40 to 50% by weight, said latex containing $Na_4P_2O_7$ and a relatively small quantity of more than one additional emulsifying agent, the additional emulsifying agents being added to said latex after about 50% polymerization conversion and the additional emulsifying agents being selected from the group consisting of anionic and nonionic emulsifiers.

13. A freeze stable latex of an aqueous emulsion copolymer of about 63% by weight of styrene and about 37% 1,3-butadiene polymerized in the presence of 1.0 to 2.0 parts of potassium persulfate, 0.1 to 1.3 parts initial charge of an anionic emulsifying agent and 90 to 150 parts initial charge of water, per 100 parts bv weight of monomers, the polymerization conducted in the pH range of 8.0 to 10.0 and the total solids of the latex being in the range of 40 to 50% by weight, said latex containing $Na_2B_4O_7$ and a relatively small quantity of more than one additional stabilizing emulsifying agent, the additional emulsifying agents being added to said latex after about 50% polymerization conversion and the additional emulsifying agents being selected from the group consisting of anionic and nonionic emulsifiers.

14. A freeze stable water dispersion paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, and water-dispersed paint pigment admixed with the latex, said paint pigment being water-dispersed by a pigment dispersing agent and said dispersion paint containing a relatively small quantity of more than one additional stabilizing emulsifying agent added to said latex after 50% polymerization conversion and before admixing with said water-dispersed paint pigment, the additional emulsifying agents being selected from the group consisting of anionic and nonionic emulsifiers.

15. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, said latex containing a relatively small quantity of more than one additional stabilizing emulsifying agent added to the latex after 50% polymerization conversion, the additional emulsifying agents being selected from the group consisting of anionic and nonionic emulsifiers.

16. A freeze stable water dispersion paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, and water-dispersed paint pigment admixed with the latex, said paint pigment being water-dispersed by a pigment dispersing agent and said dispersion paint containing a relatively small quantity of more than one additional stabilizing emulsifying agent added to said latex after 50% polymerization conversion and before admixing with said water-dispersed paint pigment, at least one of said emulsifying agents being an alkyl aryl polyether alcohol.

17. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, said latex containing a relatively small quantity of more than one additional stabilizing emulsifying agent added to the latex after 50% polymerization conversion, at least one of said emulsifying agents being an alkyl aryl polyether alcohol.

18. A freeze stable water dispersion paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, and water-dispersed paint pigment admixed with the latex, said paint pigment being water-dispersed by a pigment dispersing agent and said dispersion paint containing a relatively small quantity of more than one additional stabilizing emulsifying agent added to said latex after 50% polymerization conversion and before admixing with said water-dispersed paint pigment, at least one of said emulsifying agents being an alkyl aryl sulfonate.

19. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, said latex containing a relatively small quantity of more than one additional stabilizing emulsifying agent added to the latex after 50% polymerization conversion, at least one of said emulsifying agents being an alkyl aryl sulfonate.

20. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, said latex containing a relatively small quantity of more than one additional stabilizing emulsifying agent added to the latex after 50% polymerization conversion, at least one of said emulsifying agents being a fugitive soap selected from ammonium and substituted ammonium soaps of carboxylic acids.

21. A freeze stable water dispersion paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, the latex characterized by a specific surface in the range of 3 to 60 square meters per gram of dry copolymer, and water-dispersed paint pigment admixed with the latex, said paint containing a relatively small quantity of more than one additional stabilizing emulsifying agent added to said latex after polymerization and before admixing with said water-dispersed paint pigment, the additional emulsifying agents being selected from the group consisting of anionic and nonionic emulsifiers.

22. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, at a pH in the range of 7.0 to 12.0, the latex characterized by a specific surface in the range of 3 to 60 square meters per gram of dry copolymer, said latex containing a relatively small quantity of more than one additional stabilizing emulsifying agent added to the latex after polymerization, the additional emulsifying agents being selected from the group consisting of anionic and nonionic emulsifiers.

23. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, said latex containing a relatively small quantity of an additional stabilizing emulsifying agent added to the latex after 50% polymerization conversion, said additional stabilizing emulsifying agent being a nonionic emulsifier.

24. A freeze stable latex of an aqueous emulsion copolymer of 61 to 73% by weight of styrene and correspondingly 39 to 27% 1,3-butadiene polymerized in the presence of about 1.0 to 2.0 parts of a soluble salt of a persulfuric acid and 0.02 to 2.5 parts initial charge of an anionic emulsifying agent, per 100 parts by weight of monomers, said latex containing a relatively small quantity of an additional stabilizing emulsifying agent added to the latex after 50% polymerization conversion, said additional stabilizing emulsifying agent being an alkyl aryl polyether alcohol.

25. A freeze stable water-dispersion paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, and water-dispersed paint pigment admixed with the latex, said paint pigment being water-dispersed by a pigment dispersing agent and said dispersion paint containing a relatively small quantity of an additional stabilizing emulsifying agent added to said latex after 50% polymerization conversion and before admixing with said water-dispersed paint pigment, said additional stabilizing emulsifying agent being a nonionic emulsifier.

26. A freeze stable water-dispersed paint consisting essentially of a stable latex of an aqueous emulsion copolymer of 61 to 73% by weight of styrene and correspondingly 39 to 27% 1,3-butadiene polymerized in the presence of about 1.0 to 2.0 parts of a soluble salt of persulfuric acid and 0.02 to 2.5 parts initial charge of an anionic emulsifying agent, per 100 parts by weight of monomers, and water-dispersed paint pigment admixed with the latex, said paint pigment being water-dispersed by pigment dispersing agent and said dispersion paint containing a relatively small quantity of an additional stabilizing emulsifying agent added to said latex after 50% polymerization conversion and before admixing with said water-dispersing paint pigment, said additional stabilizing emulsifying agent being an alkyl aryl polyether alcohol.

27. A method of producing a freeze stable latex comprising polymerizing 61 to 73% by weight of a styrene with correspondingly 39 to 27% of a conjugated diolefin, in aqueous emulsion in the presence of about 1.0 to 2.0 parts of a soluble salt of persulfuric acid and 0.02 to 2.5 parts initial charge of an anionic emulsifying agent to produce a latex, and adding a relatively small quantity of an additional stabilizing emulsifying agent to the latex after 50% polymerization conversion, said additional stabilizing emulsifying agent being a nonionic emulsifier.

28. A method of producing a freeze stable water dispersion paint comprising polymerizing 61 to 73% by weight of a styrene with correspondingly 39 to 27% of a conjugated diolefin, in aqueous emulsion in the presence of about 1.0 to 2.0 parts of a soluble salt of persulfuric acid and 0.02 to 2.5 parts initial charge of an anionic emulsifying agent to produce a latex, adding a relatively small quantity of an additional stabilizing emulsifying agent to the latex after 50% polymerization conversion, said additional stabilizing emulsifying agent being a nonionic emulsifier, and thereafter admixing said latex with water-dispersed paint pigment.

No references cited.